(12) United States Patent
Ku

(10) Patent No.: US 7,412,614 B2
(45) Date of Patent: Aug. 12, 2008

(54) POWER MANAGEMENT USING A PRE-DETERMINED THERMAL CHARACTERISTIC OF A MEMORY MODULE

(75) Inventor: Joesph W. Ku, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 406 days.

(21) Appl. No.: 10/836,018

(22) Filed: Apr. 29, 2004

(65) Prior Publication Data

US 2005/0246558 A1    Nov. 3, 2005

(51) Int. Cl.
    *G06F 1/26* (2006.01)
(52) U.S. Cl. .................. 713/321; 365/211; 365/227
(58) Field of Classification Search ......... 713/320–324; 365/211, 227
    See application file for complete search history.

(56) References Cited

U.S. PATENT DOCUMENTS

| 5,713,030 | A | 1/1998 | Evoy |
| 5,867,719 | A * | 2/1999 | Harris, II et al. ............. 713/324 |
| 6,373,768 | B2 | 4/2002 | Woo et al. |
| 6,691,237 | B1 * | 2/2004 | Verdun et al. ................ 713/320 |
| 6,901,521 | B2 * | 5/2005 | Chauvel et al. ............. 713/300 |
| 6,992,475 | B2 * | 1/2006 | Perner ..................... 324/158.1 |
| 7,064,994 | B1 * | 6/2006 | Wu ............................. 365/211 |

* cited by examiner

*Primary Examiner*—Thuan N Du

(57) ABSTRACT

A computer system includes a memory module. Power management in the computer system is performed with at least one temperature rise parameter ($\Delta Tx$) of the memory module.

20 Claims, 2 Drawing Sheets

POWER MANAGEMENT USING A PRE-DETERMINED THERMAL CHARACTERISTIC OF A MEMORY MODULE

BACKGROUND

Power management in a computer system involves efficiently directing power to different components of the computer system, and reducing power to components that aren't being used. Monitors can be turned off, CPU power consumption can be reduced, and hard disks can be spun down after a set period of inactivity. The computer system can automatically enter a Hibernate or Suspend state after a set period of inactivity. Such power management can prevent electricity from being wasted. Such power management can also increase battery life of portable devices that rely on battery power.

Power management is becoming more important for reducing heat dissipation. Systems are becoming smaller, current densities are becoming higher, and components such as memory modules are being operated at higher frequencies. Higher current densities and higher operating frequencies result in higher power dissipation and higher system temperatures. The higher system temperatures can cause thermal problems, such as adversely affecting system reliability, and overstressing components. Overstressed components can fail prematurely.

There a variety of ways in which power management may be performed. For example, a power management unit could perform power supply scaling, voltage and frequency Threshold (VFT) control, and cooling control. It could also issue warnings, shut down applications, and go to idle mode.

Substantial benefits can result from proper power management of system memory. Proper power management can reduce power consumption and heat dissipation.

Conventional power management of system memory involves measuring system temperatures during normal operation of a computer, and issuing power management commands if an absolute temperature limit is exceeded.

Such power management is not proactive. That is, such power management does not anticipate potential thermal problems with system memory and prevent those problems from occurring.

Proactive power management of system memory is desirable.

SUMMARY

According to one aspect of the present invention, power management in a computer system is performed with at least one temperature rise parameter ($\Delta Tx$) of the memory module. The temperature rise parameter(s) can be used directly for proactive power management of system memory.

According to another aspect of the present invention, IDDx is estimated from a pre-determined value for a temperature rise parameter ($\Delta Tx$) of a memory module, where IDDx is the current at the $x^{th}$ mode of operation of the memory module. The estimated IDDx is used to determine power dissipation of an application. In this manner, the estimated IDDX can be used indirectly for proactive power management of system memory.

Other aspects and advantages of the present invention will become apparent from the following detailed description, taken in conjunction with the accompanying drawings, illustrating by way of example the principles of the present invention.

DETAILED DESCRIPTION

Figure 1:
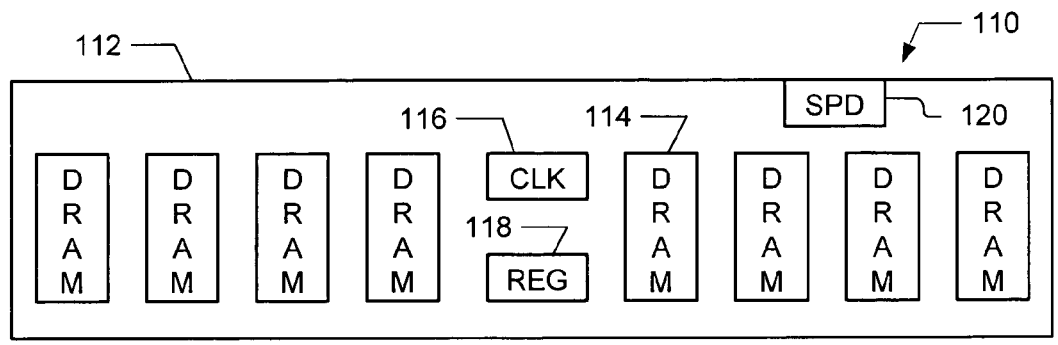
FIG. 1 is an illustration of a memory module according to an embodiment of the present invention.

As shown in the drawings for purposes of illustration, the present invention is embodied in a computer system including one or more memory modules. The system performs power management using pre-determined values for temperature rise ($\Delta Tx$) of a memory module. These values can be used directly and indirectly for proactive power management of the memory module(s).

Reference is made to FIG. 1, which illustrates a memory module 110. The memory module 110 includes a circuit board 112 and the following components attached to the circuit board 112: DRAM chips 114, a clock chip 116, register chips 118, and a non-volatile storage device called Serial Presence Device (SPD) 120. The memory module 110 also includes a case (not shown) for the circuit board 112 and components 114-120. Although FIG. 1 suggests a dual in-line configuration, the memory module 110 is not so limited.

The SPD 120 stores typical manufacturer-specific information and specifications of the components 114-120. One of the specifications is Tmax, which specifies the absolute maximum temperature limit of the memory module 110.

The SPD 120 also stores values for one or more temperatures rise parameters ($\Delta Tx$), where index x refers to a mode of operation and $\Delta T$ refers to a temperature rise from idle to a stable state during a mode of operation. These parameters are measures of device characteristics. A typical DRAM might have 7-10 modes of operation. However, temperature rise parameters might be supplied for some, but not all, of the modes, since each mode might not have implications for thermal dissipation or power distribution.

As an example, the SPD 120 might store values for the following temperatures rise parameters.

$\Delta T0$: Temperature rise as a memory page is activated.

$\Delta T1$: Temperature rise as a memory page is activated and read.

$\Delta T2$: Temperature rise as memory goes to pre-charge standby mode.

$\Delta T3$: Temperature rise as memory goes to active standby mode.

$\Delta T4$: Temperature rise during memory burst read-out or write in continuously.

$\Delta T5$: Temperature rise as memory goes to auto-refresh mode.

$\Delta T6$: Temperature rise as memory goes to self-refresh mode.

$\Delta T7$: Temperature rise during bank interleaved read/write continuously.

The values for the temperatures rise parameters ($\Delta Tx$) may be supplied by the memory module manufacturer. The temperature rise may be measured or estimated. The temperature rise may cover chip power handling capability as well as the package thermal characteristics of the package material For example, a temperature rise may be estimated as case temperature rise from ambient with respect to IDDx:

$$\Delta Tx = IDDx * V_{Supply} * \Theta_{CA}$$

where IDDx is the measured current at the $x^{th}$ mode of DRAM operation, $V_{Supply}$ is the supply voltage (e.g., 2.5V for DDR1, 1.8V for DDR2), and $\Theta_{CA}$ is a coefficient of thermal resistance from case to ambient at still air.

IDDx of a memory module may be measured by using a semiconductor component tester (e.g., HP83000, Adventest5581). The tester has a loop test sequence, which is set in the test program for a certain mode of operation. Then tester could capture the average current value being drawn by the memory module.

Figure 2:
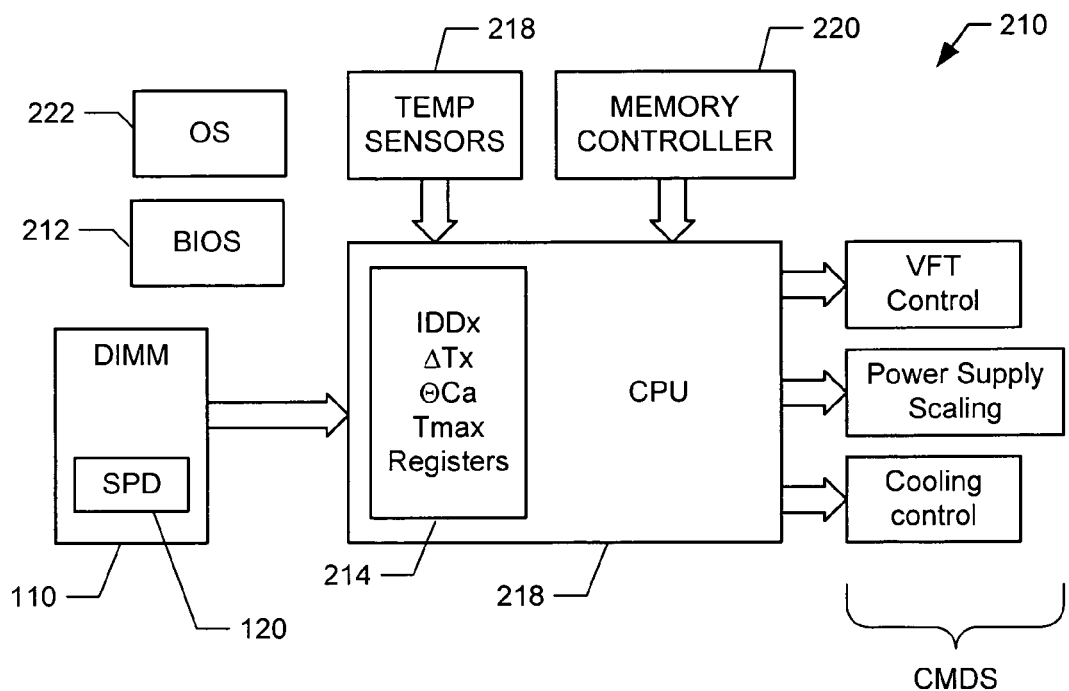
FIG. 2 is an illustration of a power management system according to an embodiment of the present invention.
Figure 3:
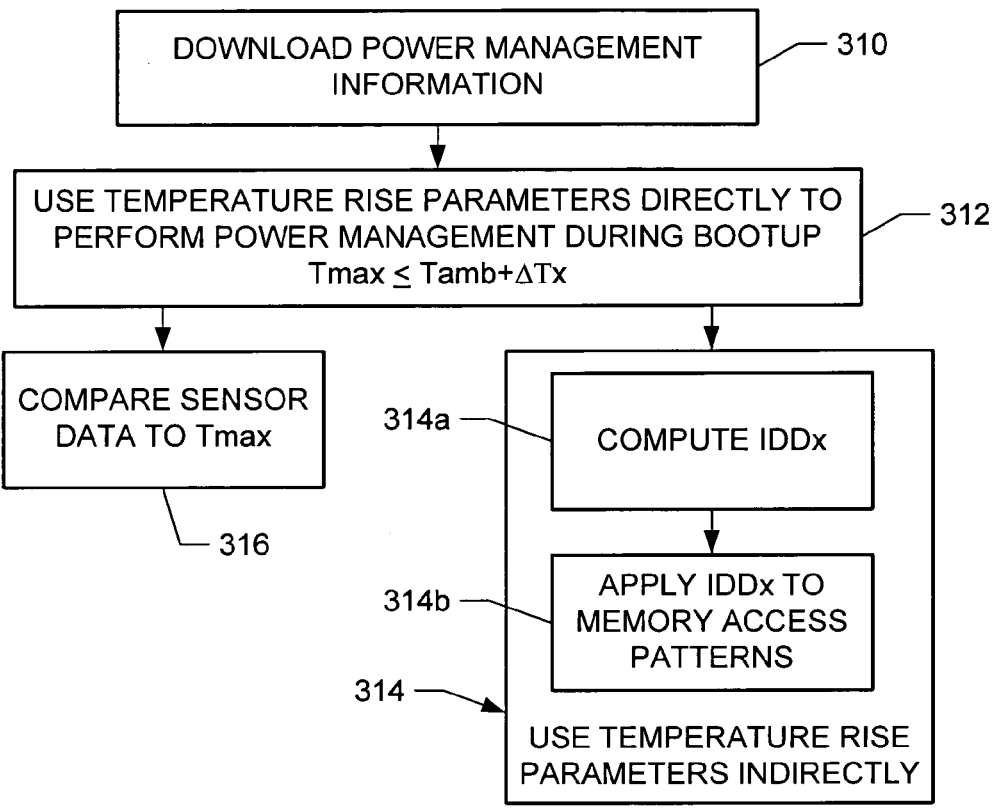
FIG. 3 is a method of performing power management according to an embodiment of the present invention.

Reference is now made to FIGS. 2 and 3, which illustrate a power management system in a computer system 210 and a method of using the temperature rise parameters to perform power management of a single memory module (power management of multiple memory modules will be discussed below). When the computer system 210 is booting up, its BIOS 212 initiates action to download the SPD of the memory module and stores information for performing power management (310). The power management information includes values for temperature rise parameters (ΔTx) of the memory module, maximum absolute maximum temperature limit (Tmax) of the memory module, the case thermal transfer coefficient ($\Theta_{CA}$) of the memory module, etc. This information may be stored local registers 214 inside the CPU of the computer system 210.

The computer system 210 directly uses the values for the temperature rise parameters to perform power management (312). The temperature rise parameters (ΔTx) can be used to estimate any potential thermal problem after powering up the computer system. The power management system measures ambient temperature (using distributed temperature sensors 216), and, for each temperature rise parameter, compares Tmax to the sum of that temperature rise parameter. If Tmax<Tamb+ΔTx (where Tamb is the ambient temperature), the power management system takes appropriate measures. Appropriate measures could include issuing commands (CMD) to adjust frequency/voltage, adjust memory access rate, and adjust cooling speed. These measures may be taken during bootup, prior to normal operation of the computer system 210.

As a first example, suppose Tmax=85° C. and ΔT7 (temperature rise due to IDD7, bank interleaved burst READ)=55° C. If the ambient temperature of the computer system is 35° C. (as measured by thermal sensors 216, then it is known at power-up that the computer system 210 cannot operate bank interleave mode with the specified frequency. Therefore, measures are taken to ensure that Tmax is not exceeded. Such measures could include issuing cooling commands to reduce ambient temperature, reducing the frequency/voltage, disabling bank interleaved burst mode, etc.

As a second example, suppose Tmax=95° C. and ΔT4=55° C. During system initialization, the ambient temperature is measured, and added to ΔT4. If the sum exceeds 95° C., a warning is immediately issued that the system might potentially crash if the "burst Read" will be used and if the cooling method (e.g., fan speed) cannot bring down the ambient temperature. Appropriate measures could be taken, such as adjusting frequency/voltage, adjusting memory access rate, adjusting cooling speed.

During normal operation of the computer system 210, power management can be performed by power estimation through the indirect use of the temperature rise parameters (314), or by direct temperature measurement through distributed sensors (316), or by both techniques. Both techniques are not mutually exclusive, but can compliment each other in most of the cases.

The indirect use of the temperature rise parameters may be performed as follows. The system estimates IDDx from ΔTx (314a). Each IDDx may be estimated as IDDx=ΔTx/ ($V_{supply} * \Theta_{CA}$), and stored.

The estimated values for IDDx may be used by determining memory access patterns by an application, and using the IDDx and the memory access patterns to estimate the power dissipation during memory access operations (314b). The estimated power dissipation can be used, for example, to scale power supply (e.g., use only 3 of 5 available voltage Regulator Module (VRM)) to be used in running the application; scale down the memory access frequency proactively to prevent the possibility of overheating the devices; adjust cooling control to optimize the energy being used in removing heat; and perform real time system frequency and voltage adjustment.

Power management via temperature measurement (316) can be performed in a conventional manner. The distributed sensors 216 could continuously sense temperatures, and the sensed temperatures could be used for real time comparisons against Tmax. If the sensed temperature exceeds Tmax, appropriate measures can be taken. Such measures might include issue cooling or VFT commands or simply issuing a warning message. The temperature sensors 216 could be placed on several critical places on the memory system PC board (e.g., center and the edge locations where hot spots may occur). Temperature sensors may be built-in on chip for more detailed power management.

Figure 4:
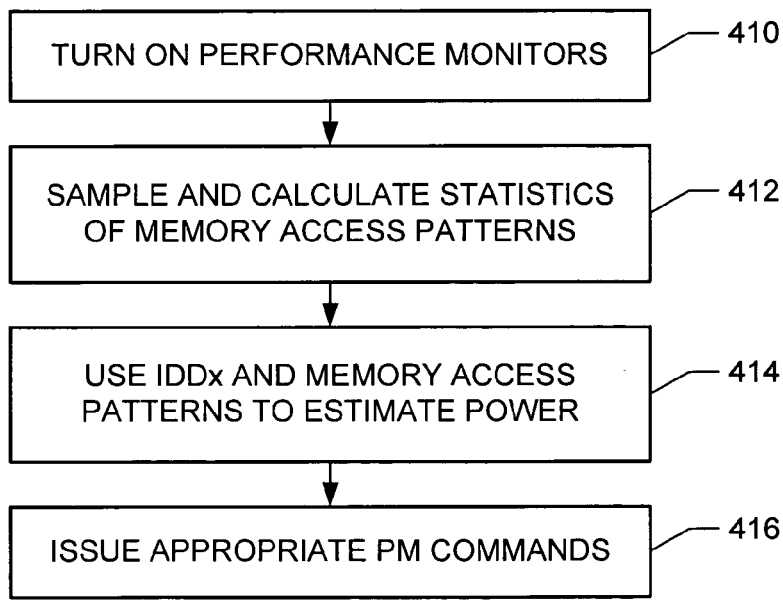
FIG. 4 is an illustration of a method of using estimated IDDx according to an embodiment of the present invention

Reference is made to FIG. 4, which illustrates a method of using the estimated IDDx. The computer system is designed with a set of memory performance monitors on board. At the beginning of running any application (e.g., Adobe Photoshop), the performance monitor is turned on (410). These monitors sample and calculate the statistics of memory access patterns while certain software applications are running (412). These statistics may include page hit rate, read and write percentage and average standby percentage of period. The memory access patterns are sampled during a sampling time window. The sampling time window and sampling frequency could be adjusted by user's definition or by default.

At the end of each sampling window (e.g., 5 minutes), the estimated IDDx and the statistics may be used to estimate the power at that time (414). For example: if the memory access statistics showed page hit rate 30%, read/write 40%, standby 20%, a simple power calculation might be:

$$IDD_0*(1-\text{hit rate})+IDD_{4R}*40\%+IDD_{4W}*40\%+ IDD_3*20\%+\text{extra I/O power.}$$

This is only a simple illustration. In actual practice, a more complex power calculation is likely.

Appropriate power management commands may be issued to ensure that the temperature remains below Tmax (416).

Returning to FIG. 1, the methods above can be implemented by a "power management unit." The power management unit can be part of an operating system (OS), which is stored in memory 222 and executed by a CPU 218, in the alternative, the power management unit can be built into hardware (e.g., built into the memory controller 220), etc. With the help of BIOS 212, a hardware-implemented power management unit can be self-regulating. The BIOS 212 stores the system initialization sequence including memory subsystem and some routines to communicate with I/O devices.

All of the aforementioned power parameters and power management functions (including the power calculation formula) could also be stored in the BIOS 212. With or without memory performance monitors, the power management unit could get the temperature sensor data to make adjustments, such as issuing power management commands, slow down the operation frequency, or even suspend the memory operation temporarily to let the temperature come down. With $\Delta Tx$ and $IDDx$, plus real time memory performance monitor, the power management unit could do adjustment proactively and dynamically, and hence optimize the power delivery and consumption.

If indirect use of IDDx includes learning memory access patterns, the performance monitors may be built into the memory controller 220. In the alternative, the performance monitors may be built into the operating system 222.

The methods above involved a single memory module. If a memory system includes multiple memory modules with different $\Delta Txs$, the smallest set of temperature rise parameters may be used as the system criterion for power management unit. In the alternative, separate computations be performed for each memory module. If for some reasons, one memory module gets hit most of the time, there might be an application issue or a design issue. If any one module exceeds its Tmax, the power management unit intervenes to reduce the temperature, but not necessary to shut down that memory module.

The computer system is not limited to any particular type. Instances of the computer system include, without limitation, a personal computer, workstation, Internet appliance, and enterprise server.

Although several specific embodiments of the present invention have been described and illustrated, the present invention is not limited to the specific forms or arrangements of parts so described and illustrated. Instead, the present invention is construed according to the following claims.

The invention claimed is:

1. A method of estimating power dissipation in a computer system, the computer system including a memory module, the method comprising:
   determining at least one temperature rise parameter of the memory module for a mode of operation;
   estimating current drawn by the memory module during a mode of operation based at least on the temperature rise parameter for the mode of operation;
   estimating the power dissipation of the memory module during the mode of operation based at least on the current drawn by the memory module during the mode of operation; and
   accessing an absolute temperature limit for the memory module, the temperature rise parameter being used by accessing a value for the temperature rise parameter, summing the value with a value indicating ambient temperature, and comparing the sum to the temperature limit.

2. The method of claim 1, wherein the memory module has multiple modes of operation; and wherein a plurality of different temperature rise parameters are used for different modes.

3. The method of claim 1, wherein a value for each parameter is estimated from current drawn during a specific mode, memory supply voltage, and case thermal resistance.

4. The method of claim 1, wherein the memory module includes at least one serial presence device, and wherein the determining includes accessing at least one temperature rise parameter from the at least one serial presence device.

5. The method of claim 1, wherein one mode of operation is system bootup.

6. The method of claim 1, further comprising taking steps to reduce power dissipation in the memory module, the steps taken in response to the comparison.

7. The method of claim 1, wherein different temperature rise parameter values are determined for different modes of operation of the memory module; and wherein each parameter value is used in a comparison to an absolute temperature limit of the memory module.

8. The method of claim 1, wherein estimating the power dissipation further comprises applying estimated current to the memory module based on an application that uses the memory module.

9. The method of claim 8, wherein the current draw is derived by calculating statistics of current draw while certain software applications are running.

10. The method of claim 8, wherein the current draw is learned during startup of the application.

11. The method of claim 8, wherein estimating the current draw includes sampling and calculating statistic of the current draw while the application is running.

12. The method of claim 11, further comprising measuring system temperatures during normal operation of the computer, and comparing the measured system temperatures to an absolute temperature limit.

13. The method of claim 1, wherein the temperature rise parameter is determined during normal operation of the computer system.

14. A method of performing power management in a computer system with respect to an application, the computer system including a memory module, the method comprising:
   computing the current draw of the memory module for a mode of operation based on at least one pre-determined value for temperature rise of the memory module for the mode of operation;
   using the current draw of the memory module for the mode of operation to estimate power dissipation of the memory module when the application is running; and
   accessing an absolute temperature limit for the memory module, summing the value for temperature rise with a value indicating ambient temperature, and comparing the sum to the temperature limit.

15. The method of claim 14, wherein at least one value for temperature rise is estimated from current draw of the memory module for a mode of operation, memory supply voltage, and case thermal resistance.

16. The method of claim 14, further comprising reducing power dissipation in the memory module in response to the comparison.

17. The method of claim 14, wherein different temperature rise parameter values are accessed for different modes of operation of the memory module; and wherein each parameter value is used in a comparison to an absolute temperature limit of the memory module.

18. A computer comprising:
   a memory module;
   computer-readable memory encoded with power management software for:
      determining a value for at least one temperature rise parameter of the memory module;
      computing the current draw of the memory module for a mode of operation based on the value for temperature rise of the memory module for the mode of operation;
      using the current draw of the memory module for the mode of operation to estimate power dissipation of the memory module when the application is running; and accessing an absolute temperature limit for the memory module, calculating the temperature rise based on a value for the temperature rise parameter, summing the temperature rise with a value indicating ambient temperature, and comparing the sum to the temperature limit.

19. The computer of claim 18, wherein a value for each temperature rise parameter is estimated based on at least one of memory supply voltage and case thermal resistance.

20. The computer of claim 18, wherein different temperature rise parameter values are accessed for different modes of operation of the memory module; and wherein each parameter value is used in a comparison to an absolute temperature limit of the memory module.

* * * * *

UNITED STATES PATENT AND TRADEMARK OFFICE
CERTIFICATE OF CORRECTION

| | | |
|---|---|---|
| PATENT NO. | : 7,412,614 B2 | Page 1 of 1 |
| APPLICATION NO. | : 10/836018 | |
| DATED | : August 12, 2008 | |
| INVENTOR(S) | : Joseph W. Ku | |

It is certified that error appears in the above-identified patent and that said Letters Patent is hereby corrected as shown below:

On the title page, item (75), in "Inventors" in column 1, line 1, delete "Joesph" and insert -- Joseph --, therefor.

Signed and Sealed this

Eleventh Day of November, 2008

JON W. DUDAS
*Director of the United States Patent and Trademark Office*